(12) United States Patent
Becker et al.

(10) Patent No.: US 6,623,673 B1
(45) Date of Patent: Sep. 23, 2003

(54) METHOD FOR THE METERED DISCHARGE OF A STRING OF A VISCOUS MEDIUM AND FEEDPUMP FOR DISCHARGING A STRING OF A VISCOUS MEDIUM

(75) Inventors: Manfred Becker, Ober-Ramstadt (DE); Bernd Gerner, Wald-Michelbach (DE); Hendrik Hovy, Mühltal (DE); Erwin Sowa, Alsbach (DE); Matthias Reck, Ober-Ramstadt (DE)

(73) Assignee: Datron-Electronic GmbH (DE)

( * ) Notice: Subject to any disclaimer, the term of this patent is extended or adjusted under 35 U.S.C. 154(b) by 135 days.

(21) Appl. No.: 09/654,619

(22) Filed: Sep. 5, 2000

(30) Foreign Application Priority Data

Sep. 3, 1999 (DE) .......................................... 199 42 219
Apr. 26, 2000 (DE) .......................................... 100 20 295

(51) Int. Cl.⁷ ............................................. B29C 47/00
(52) U.S. Cl. ..................................... 264/40.4; 264/40.7
(58) Field of Search .............................. 264/40.4, 40.7, 264/176.1; 222/71; 425/145

(56) References Cited

U.S. PATENT DOCUMENTS

| | | | | |
|---|---|---|---|---|
| 3,881,654 A | * | 5/1975 | Larkin ........................ 239/127 |
| 4,043,294 A | * | 8/1977 | Morine et al. ............... 118/25 |
| 4,643,863 A | * | 2/1987 | Martini ........................ 249/57 |
| 5,641,438 A | * | 6/1997 | Bunyan et al. .............. 264/104 |
| 6,054,077 A | | 4/2000 | Comb et al. | |
| 6,106,266 A | * | 8/2000 | Ruger ......................... 366/76.5 |
| 6,390,622 B1 | * | 5/2002 | Muckenhirn et al. ....... 351/161 |

FOREIGN PATENT DOCUMENTS

| | | |
|---|---|---|
| DE | 871352 | 7/1953 |
| DE | 38 33 776 | 4/1989 |
| DE | 196 47 015 C1 | 12/1997 |
| DE | 197 33 627 C1 | 6/1998 |
| EP | 559582 | 9/1993 |
| EP | 5770622 | 1/1994 |
| EP | 1027979 | 8/2000 |
| GB | 750856 | 6/1956 |
| JP | 10193474 | 7/1998 |
| JP | 10249919 | 9/1998 |
| WO | WO 8700480 | 1/1987 |
| WO | WO 9851405 | 11/1998 |

OTHER PUBLICATIONS

Article taken from Fortschritt–Berichte Der VDI Zeitschriften entitled "Pheometrische Untersuchungen am System Polyvinylchlorid–Weichmacher" by Bernd, Kuhn, Ravensburg dated 1977, 7 pp 6, 7 and 13–15.

* cited by examiner

*Primary Examiner*—Mark Eashoo
(74) *Attorney, Agent, or Firm*—Ostrolenk, Faber, Gerb & Soffen, LL

(57) ABSTRACT

A method for the metered discharge of a string of a viscous medium, in particular of an abrasive medium containing solid particles, via a nozzle, in which the quantity of the medium is discharged as a function of the speed of the nozzle and is increased or reduced as a function of the acceleration or deceleration of the nozzle.

2 Claims, 5 Drawing Sheets

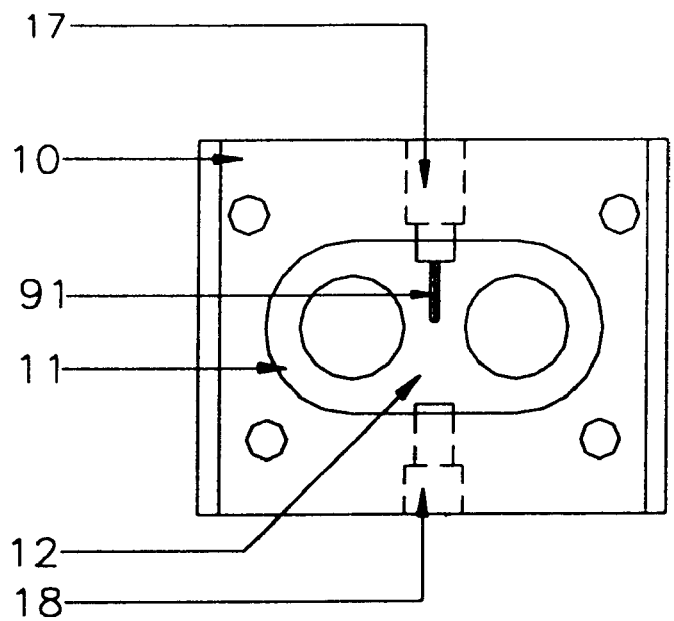
Fig. 1d
Fig. 1c
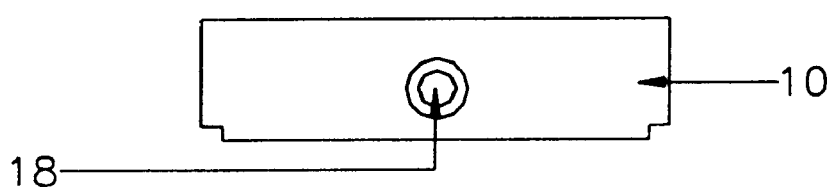
Fig. 1b
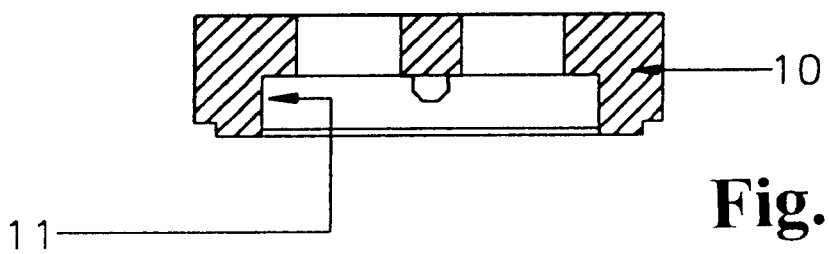
Fig. 1a

METHOD FOR THE METERED DISCHARGE OF A STRING OF A VISCOUS MEDIUM AND FEEDPUMP FOR DISCHARGING A STRING OF A VISCOUS MEDIUM

BACKGROUND OF THE INVENTION

1. Field of the Invention

The invention relates to a method and a feedpump for the metered discharge of a string of a viscous medium.

2. Discussion of the Prior Art

A device for the metered extrusion of a string of a viscous medium is taught by German reference DE 196 47 015 C1. A piston pump is used in this device. The extrusion stroke of the piston of the piston pump is accurately controlled by the piston pump being hydraulically coupled to a gear pump via a high-viscosity hydraulic fluid. The gear pumps used for this purpose are distinguished by a high constancy of delivery and therefore of the extruded string, the start of discharge also being capable of being controlled accurately. However, they are not suitable for the extrusion of abrasive media, for example of sealing compounds enriched with a high percentage of silver flakes and such as are used, for example, for the high-frequency sealing of high-frequency housings.

Seals of this kind are known from German reference DE 197 33 627 C1.

Conventional methods and devices for the metered application of viscous media, so-called dispenser machines, operate on pressure/time-controlled principles. These have the disadvantage that the volumetric flow of the compound to be metered cannot be controlled in proportion to the speed of movement. Since, in most cases, the drives of the coordinate tables moving the metering head accelerate in ramps, uneven metering bead cross sections occur in acceleration and braking phases.

SUMMARY OF THE INVENTION

Accordingly, it is an object of the present invention to provide a method and a feedpump for the metered discharge of a string of a viscous medium, in particular of an abrasive medium containing solid particles, which make it possible to have highly accurate application cross sections (beads) at a high speed of movement and, in particular, even in the case of changing speeds, such as occur at radii, etc., of the nozzle discharging the medium.

The basic idea of the invention is to provide a method, in which a constant quantity of the viscous medium is always discharged, irrespective of the speed of movement of the nozzle. This is achieved in that the quantity of the medium is discharged in proportion to the speed of the nozzle and is increased or reduced as a function of the acceleration or deceleration of the nozzle. It is thereby possible always to discharge the same bead cross section of the medium, for example even during the discharge of a curved bead, in which case the nozzle discharging the medium is decelerated, or else during the discharge of a rectilinear bead, in which case the nozzle is accelerated.

In an advantageous embodiment, there is, at the same time, provision for the discharged quantity to be in proportion to the sum, multiplied by a quantity factor, of the nozzle speed, of the nozzle acceleration multiplied by a factor A and of the square of the nozzle speed multiplied by a further factor B:

Quantity factor·(nozzle speed+acceleration·factor A+square of the speed·factor B).

The discharged quantity can therefore be modified essentially by means of three factors. The quantity factor modifies the total quantity to be discharged and makes it possible to determine whether the bead to be discharged is thicker or thinner. The factor A compensates the dynamic material properties. It takes into account, in particular, whether the viscous quantity behaves in a non-Newtonian way, for example in the same way as a thixotropic medium, in the same way as a dilatant medium or else in the same way as a Newtonian medium. The factor B compensates a speed-dependent nonlinearity which is determined, for example, by a leakage in the pump and by the material behavior (viscosity) of the medium to be discharged.

The constants are preferably determined by measurement as a function of the material to be discharged.

The feedpump according to the invention for the discharge of a string of a viscous medium is particularly suitable for this purpose. The basic idea on which it is based is, on the one hand, to use the accurate metering possibilities of a gearpump and, on the other hand, to make it possible to process even abrasive media. Precisely by means of a feedpump with two gearwheels driven to execute oppositely directed rotation and arranged in a casing so as to be spaced both from the casing walls and from one another, the quantity can be set accurately as a function of the speed of movement and of the movement acceleration or deceleration of the nozzle.

In order, when abrasive media are used, to avoid the pump being damaged due to a "seizure" occurring as a result of sintering processes in the particles bound in the medium, a groove spaced equally from the two gearwheels is arranged in each case both in a casing cover and in a casing bottom of the casing. Furthermore, a defined equal spacing between the teeth of the two gearwheels is provided, thus allowing pressure compensation in the region of the teeth, running apart or together, of the gearwheels of the gearpump.

Advantageously, the grooves are in alignment with the inlet and the outlet of the feedpump and extend for a predetermined length in the casing bottom and the casing cover.

In order to allow the gearwheels to run with as little friction as possible, they have, at their upper and lower edge, an essentially circular web-like spacer ring which bears on the casing bottom and the casing cover respectively.

Furthermore, the gearwheels may also have a web-like design in cross section, so that web-like spacer rings can be dispensed with.

The gearwheels preferably consist of one or more of the following materials: plastic, ceramic, metal having a non-stick coating, and metal having a hard anodic coating, the coatings being harder than the abrasive media. In order to avoid contact between the gearwheels and to ensure that a gap is arranged between the gearwheels, they are driven synchronously in opposition to one another by means of an auxiliary gear, in such a way that a gap is formed between the two gearwheels.

The invention is not limited by the embodiments described above which are presented as examples only but can be modified in various ways within the scope of protection defined by the appended patent claims.

BRIEF DESCRIPTION OF THE DRAWINGS

FIGS. 1a–1d diagrammatically show top, elevation and sectional views of a casing of a feedpump making use of the invention;

DETAILED DESCRIPTION OF THE PREFERRED EMBODIMENTS

Figure 2B:
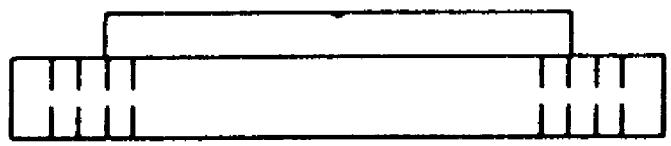
FIGS. 2a–2b show a top view and elevation of a casing cover of the casing illustrated in FIG. 1.
Figure 2A:
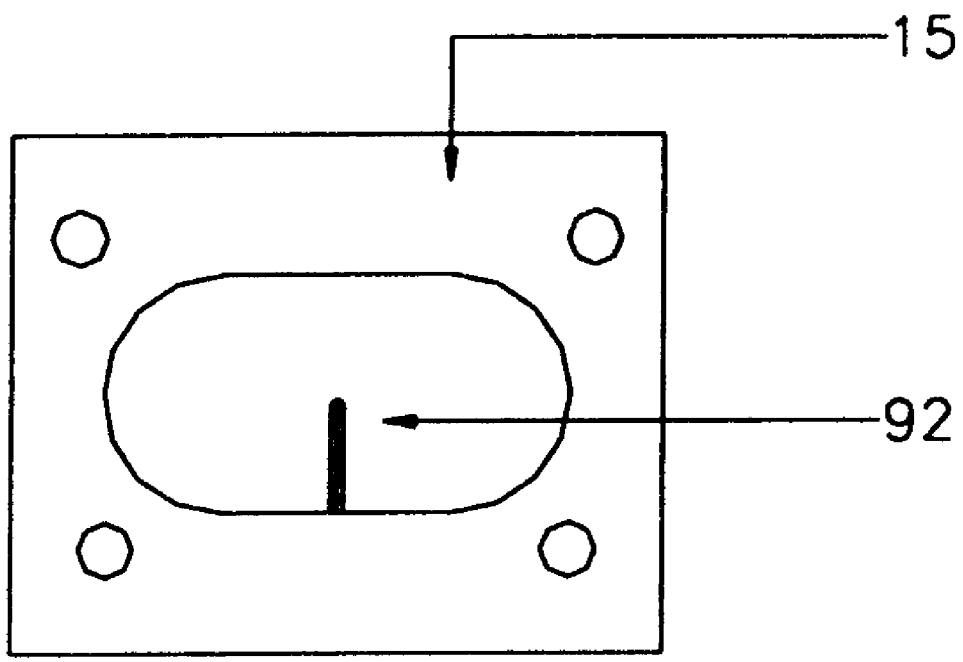
Figure 3:
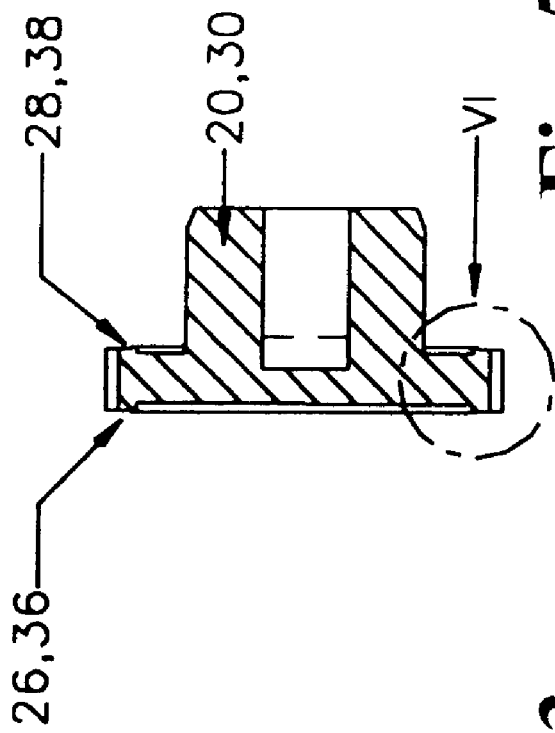
FIG. 3 shows a gearwheel of the feedpump illustrated in FIG. 1.
Figure 4:
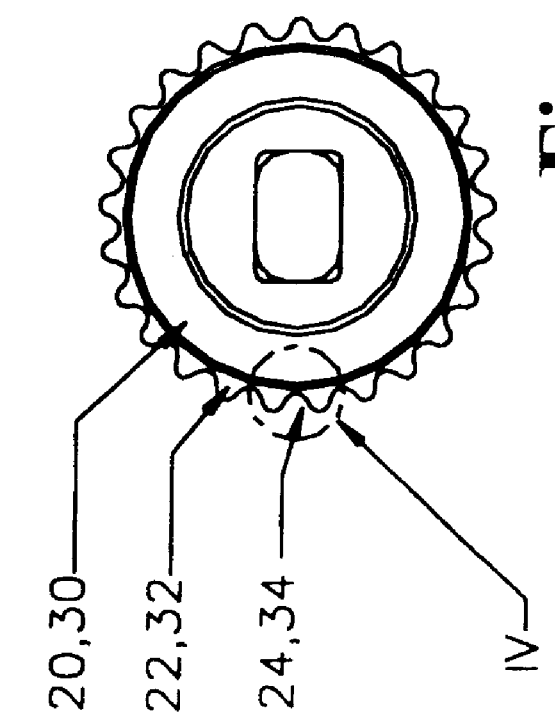
FIG. 4 shows an enlarged detail designated by IV in FIG. 3.
Figure 5:
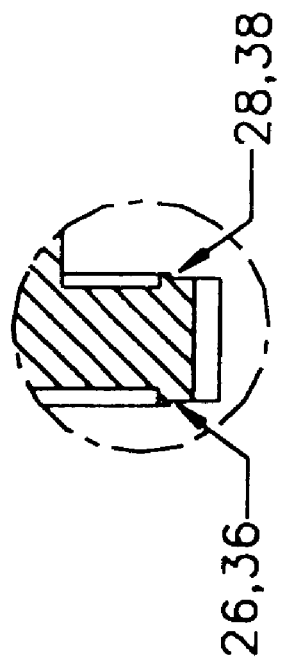
FIG. 5 shows a sectional illustration of the gearwheel illustrated in FIG. 3.
Figure 6:
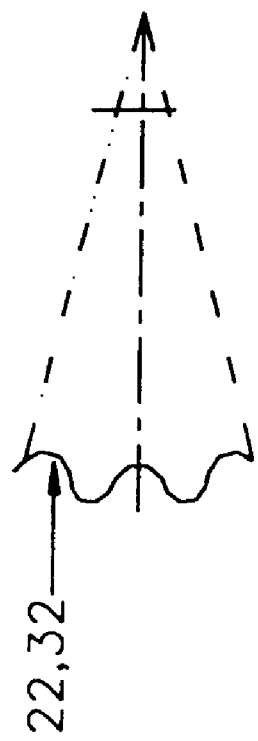
FIG. 6 shows an enlarged detail designated by VI in FIG. 5.

A feedpump, illustrated in FIG. 1 to FIG. 8, comprises a casing 10 with a receptacle 11 for two gearwheels 20, 30 which are capable of being driven synchronously in opposition to one another by means of an auxiliary gear 40. The gearwheels 20, 30 are arranged in the receptacle 11 in such a way that gaps 51 are arranged between a wall delimiting the receptacle 11 and the gearwheels 20, 30.

Figure 7:
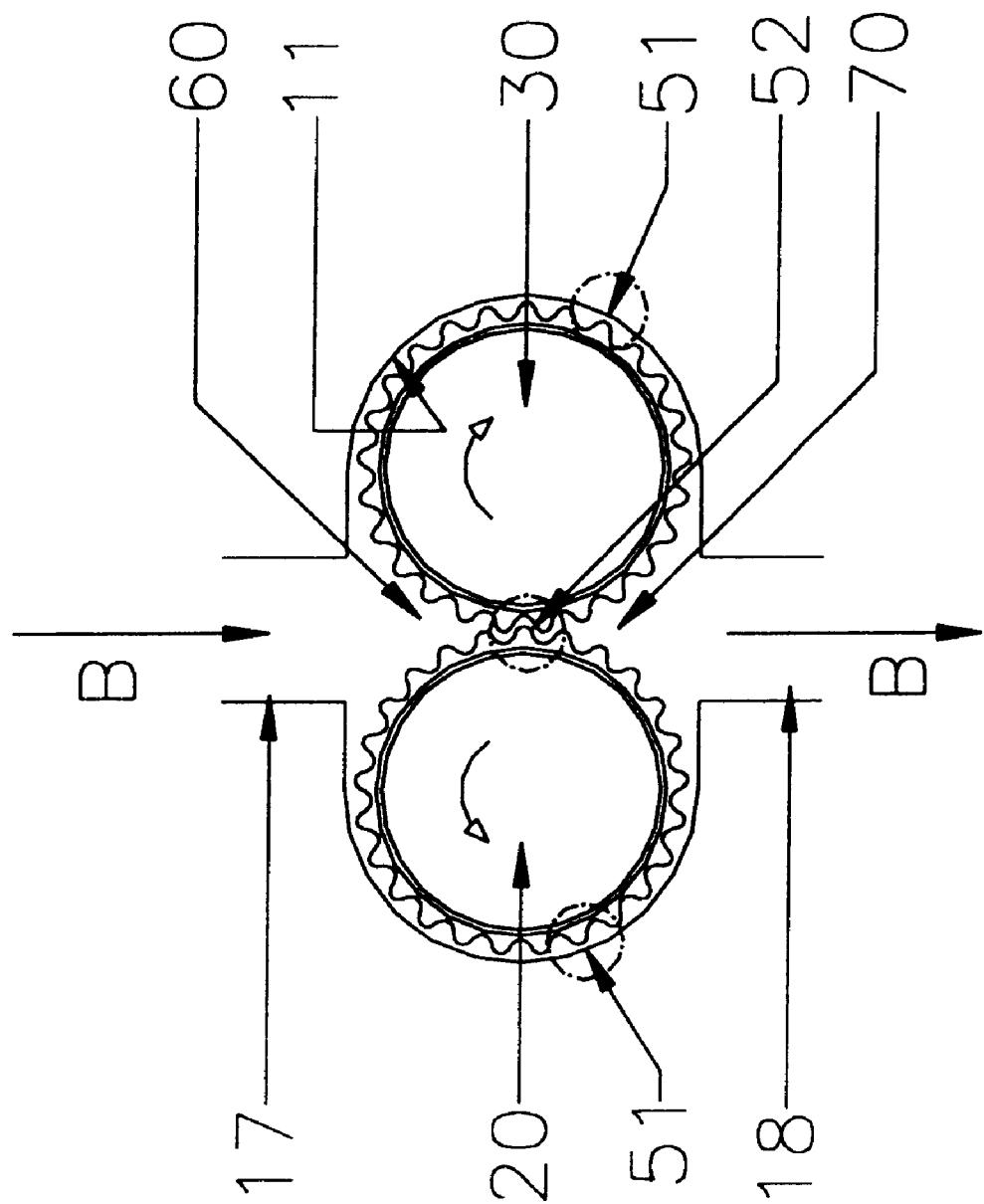
FIG. 7 diagrammatically shows the operation of the feedpump illustrated in FIG. 1 to FIG. 6.
Figure 8:
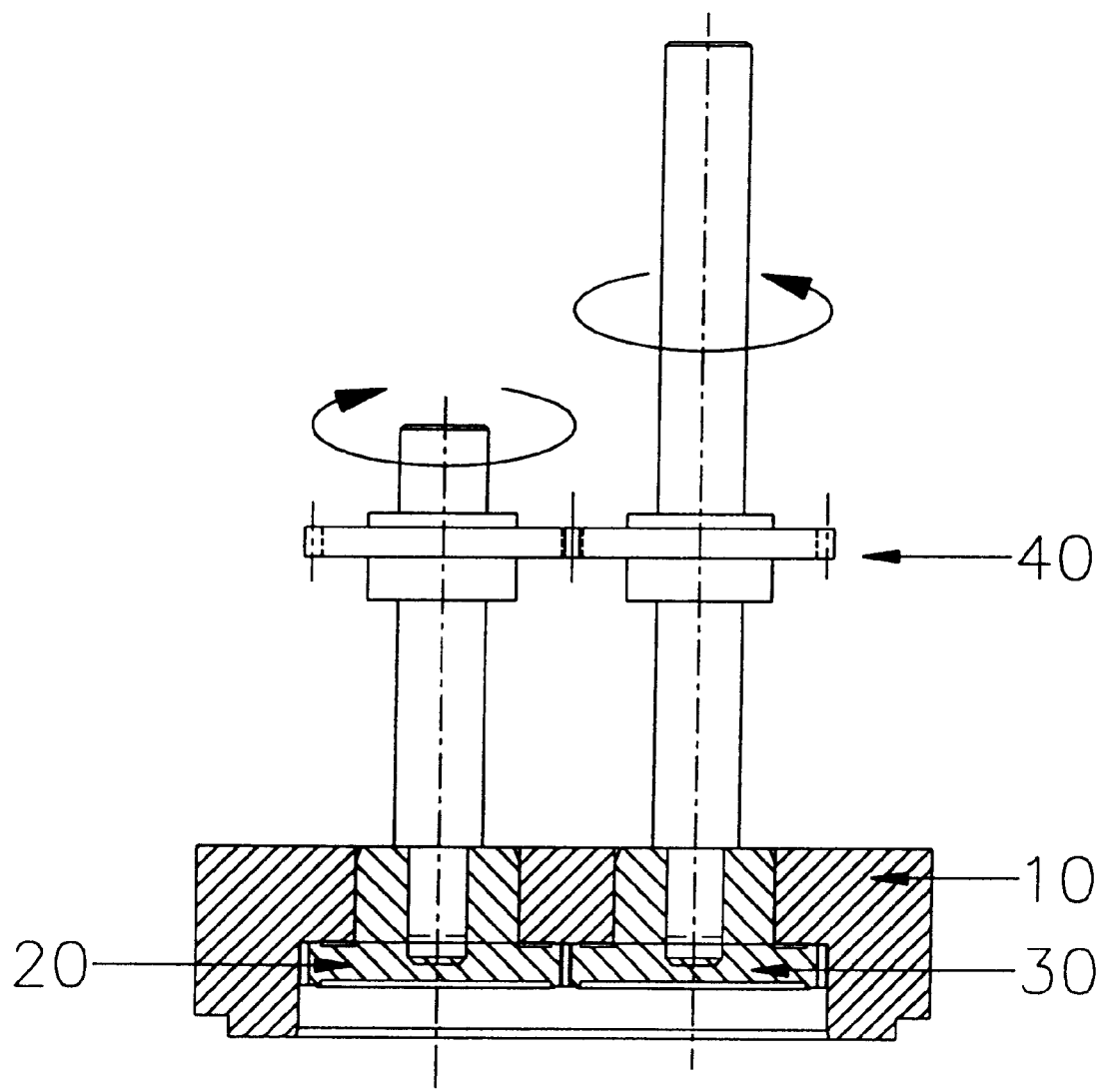
FIG. 8 diagrammatically shows the drive of the feedpump illustrated in FIG. 1 to FIG. 7.

Furthermore, the gearwheels 20, 30 are arranged in such a way that, between them, a gap 52 is arranged, the width of which corresponds to that of the gaps 51 between the gearwheels 20, 30 and the casing 10. The gap widths are adapted to the particle size of the medium to be discharged. As may be gathered, in particular, from FIGS. 3 and 4, the gearwheels 20, 30 have approximately sinusoidal toothing of the same size, in each case a tooth 22, 32 being located opposite a recess 24, 34 which is complimentary to the tooth 22, 32, but has a larger radius, so that the gap 52 of constant gap width is formed between the teeth 22, 32 and the recesses 24, 34 (see FIG. 7). As may be gathered, in particular, from FIG. 5 and FIG. 6, the gearwheels 20, 30 may advantageously have, on their top side, a circularly continuous web-like spacer ring 26, 36 or a corresponding step-like projection. A further spacer ring 28, 38 or a further step-like projection is arranged on the underside of the gearwheels 20, 30. In order to minimize the friction, the two gearwheels 20, 30 are in contact with the casing bottom and the casing cover 15 solely by means of these spacer rings 26, 36 and 28, 38 or step-like projections. The gearwheels 20, 30, then, are driven synchronously in opposition to one another by means of the auxiliary gear 40, as indicated diagrammatically by arrows in FIG. 7. As a result, a viscous medium, in particular an abrasive medium containing particles, is conveyed through an inlet 17 into the interior of the feedpump and, by virtue of the rotational movement of the gearwheels 20, 30, is conveyed along the outer wall of the receiving space 11. The conveying direction is illustrated in FIG. 7 by arrows identified by the letter B. The conveyed medium is then discharged through an outlet 18.

Since an underpressure is established in an entry region 60 when the medium is being conveyed, whereas an overpressure builds up in a region 70 adjacent to the outlet 18, grooves 91, 92 are provided both in the casing bottom 12 and in the casing cover 15 and serve to compensate for underpressure and overpressure. FIG. 1d shows a detail of the groove 91.

The rotational speed of the gearwheels 20, 30, then, is controlled as a function of the speed of movement of the nozzle (not illustrated) which discharges the medium and which is arranged at the outlet 18, in that the pump drive is integrated into the path control of a machine for discharging the medium. The gearwheels rotate more rapidly at a high speed of movement of the nozzle than at a lower speed of movement. In order to achieve a uniform metering cross section even during an acceleration or deceleration of the nozzle which become necessary, for example, when a curved bead is being applied, the gearwheels 20, 30 are rotated slightly more rapidly or slightly more slowly as a function of the acceleration and deceleration respectively. The pump rotational speed is proportional to the sum, multiplied by a quantity factor, of the nozzle speed, of its acceleration, multiplied by a factor A, and of the square of the nozzle speed multiplied by a factor B:

Pump rotational speed=quantity factor·(nozzle speed+nozzle acceleration·factor A+square of the speed·factor B).

By means of the proportionality factor designated as a quantity factor in the formula, the quantity to be discharged can be determined, that is to say it is possible to determine whether the bead is thicker or thinner. The factor A serves for compensating dynamic material properties of the medium to be discharged and, in particular, compensates the non-Newtonian behavior of the medium to be discharged, and thus takes into account the material properties. The factor B serves for compensating a speed-dependent nonlinearity which may occur, for example, due to leakage in the pump and due to the material behavior, in particular the viscosity of the medium to be discharged. Thickenings or narrowings of the sealing bead are thereby avoided. Instead, the application cross section of the bead remains constant, irrespective of the speed of movement of the nozzle and irrespective of dynamic properties of the material to be discharged.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A method for metered discharge of a string of a viscous medium by means of a pump and a nozzle, comprising the step of determining pump rotational speed according to the following formula: pump rotational speed=quantity factor·(nozzle speed+nozzle acceleration·factor A+square of the nozzle speed·factor B), the quantity factor determining a total quantity to be discharged, the factor A taking into account dynamic material properties of the medium to be discharged and the factor B taking into account speed-dependent nonlinearities.

2. A method as defined in claim 1, including determining the quantity factor, the factor A, and the factor B, by measurement as a function of the medium being discharged.

* * * * *